United States Patent [19]

Limbach, II et al.

[11] 4,117,385
[45] Sep. 26, 1978

[54] TRACER CONTROL CIRCUIT

[75] Inventors: Walter S. Limbach, II, Eighty-four; George Kusic, Pittsburgh, both of Pa.

[73] Assignee: Automation Equipment Inc., Pittsburgh, Pa.

[21] Appl. No.: 762,525

[22] Filed: Jan. 26, 1977

[51] Int. Cl.$^2$ .............................................. G05B 19/36
[52] U.S. Cl. .................................... 318/578; 318/579; 318/637
[58] Field of Search ........................ 318/578, 637, 579

[56] References Cited
U.S. PATENT DOCUMENTS

| 3,956,680 | 5/1976 | Maecker | 318/578 |
| 4,044,289 | 8/1977 | Wenzel et al. | 318/578 |

Primary Examiner—B. Dobeck
Attorney, Agent, or Firm—Webb, Burden, Robinson & Webb

[57] ABSTRACT

A tracer control circuit for guiding a probe around a template comprising analog computers for calculating normalized values of $\bar{x}$ and $\bar{y}$ deflection signals and $\dot{x}$ and $\dot{y}$ velocity signals. The circuit comprises means for rotating the vector defined by the normalized deflection signals to drive the probe tangent to the template edge and means for rotating the vector defined by the normalized velocity signals to establish a probe deflection reference against which actual deflection may be compared and controlled.

10 Claims, 5 Drawing Figures

TRACER CONTROL CIRCUIT

This invention relates to an electronic tracer probe control for a 360° tracer.

A tracer is an apparatus which enables a tool to move relative to a template and a workpiece and thus to machine the workpiece to the shape of the template. Typically, a tracer probe is fixed relative to the tool and both are moved by an X—Y drive relative to the template and workpiece. The X—Y drive is controlled by the deflection of the probe resting upon the template. If the probe can traverse a complete circle the tracer is a 360° tracer.

The criteria for judging tracer controls is 1) the accuracy with which the template is reproduced, 2) the speed with which the template is traversed, and 3) the overall cost of the tracer control and the tool. The applicants have devised a tracer control which is superior to known 360° tracers in each of the above stated criteria.

There is in the machine tool industry a trend away from tracer controls to the sophisticated and elegant numerical or tape controlled machines. These, however, are very expensive and beyond the limit of small machine shops. Even known tracers are expensive, generally because in an attempt to get suitable reproducibility very expensive hydraulic drive components are used.

It is an object according to this invention to provide a tracer control enabling substantially improved accuracy of reproduction, higher speeds and less expensive drive equipment.

The 360° tracers known to the applicants tend to provide the machined workpiece with uneven surfaces. The unevenness takes the form of protuberances or blips at eight angular positions around the template, i.e., the quadrant division points and halfway therebetween. At the quadrant division points (along the x and y axes) one of the drive motors must slow to a stop and reverse itself while the other motor is moving at its maximum speed. At this point the control of the slowly moving motor is most critical. The other angular positions at which blips are produced on the workpiece are halfway between the quadrant points where each drive motor must be moving at the same speed. These are by no means the only positions where prior art tracer controls leave blips on the workpiece, but these are the most common.

Every tracer control system has two basic problems to solve: 1) How to convert the probe deflection (assumed to be normal to the template edge) into a signal to drive the probe and the tool tangent to the template edge and the workpiece, and 2) How to maintain contact between the probe and the template. Briefly according to this invention there is provided a tracer control system (See FIGS. 1 and 2) comprising a tracer probe that bears upon a template which may be either an internal or external template. The tracer is deflected away from the template in a direction that is normal to the edge at the point of contact. In other words, the deflection is perpendicular to a tangent to the edge of the template at the point of contact. The template has associated therewith transducers, usually differential transformers, that produce $\bar{x}$ and $\bar{y}$ deflection signals indicative of the deflection of the probe in the x and y directions. The probe is mounted to be driven in the x and y directions, for example, by two hydraulic motors controlled by proportional electro-hydraulic servo controlled valves. The rotary motion of the hydraulic motors may be converted to retilinear motion by the two perpendicular worm gears. Devices, for example, tachometers produce $\dot{x}$ and $\dot{y}$ velocity signals in the x and y directions. An analog circuit computes the vector sum of the $\bar{x}$ and $\bar{y}$ deflection signals and then converts the deflection signals to normalized drive signals by dividing the deflection signals by their vector sum. The analog computing circuit also calculates the vector sum of the velocity signals and computes normalized deflection reference signals by dividing the velocity signals by their vector sum. It is possible to use an analog computer for calculating each type of normalized signal or to time share one computer for making both calculations.

The control system comprises a first adding circuit, for example, an operational amplifier in the summing configuration for combining the normalized $\bar{x}$ drive signal (derived from the $\bar{x}$ deflection signal but used to drive the Y motor as explained hereafter) and the normalized $\dot{x}$ deflection reference signal (derived from the $\dot{x}$ velocity signal but used to control the y deflection as explained hereafter). A second adding circuit combines the normalized $\bar{y}$ drive signal and the normalized $\dot{y}$ reference signal. The outputs of the first and second adding circuits are fed to inverting circuits, for example, an operational amplifier in the inverting mode. The inverting circuits each have a bypass such that only one or the other is operative. Which one is operative, i.e., which output of the first and second adding circuits is inverted (in the sense of changing the polarity of the signal) determines whether the trace is clockwise or counterclockwise as explained hereafter.

The output of the first adding circuit and the $\bar{y}$ deflection signal are combined in a third adding circuit. The output of the second adding circuit and the $\bar{x}$ deflection signal are combined in a fourth adding circuit. The output of the third and fourth adding circuits are used to drive the Y and X drive motors respectively.

Further features and other objects and advantages of this invention will become apparent from the following detailed description made with reference to the drawings in which.

Figure 2:
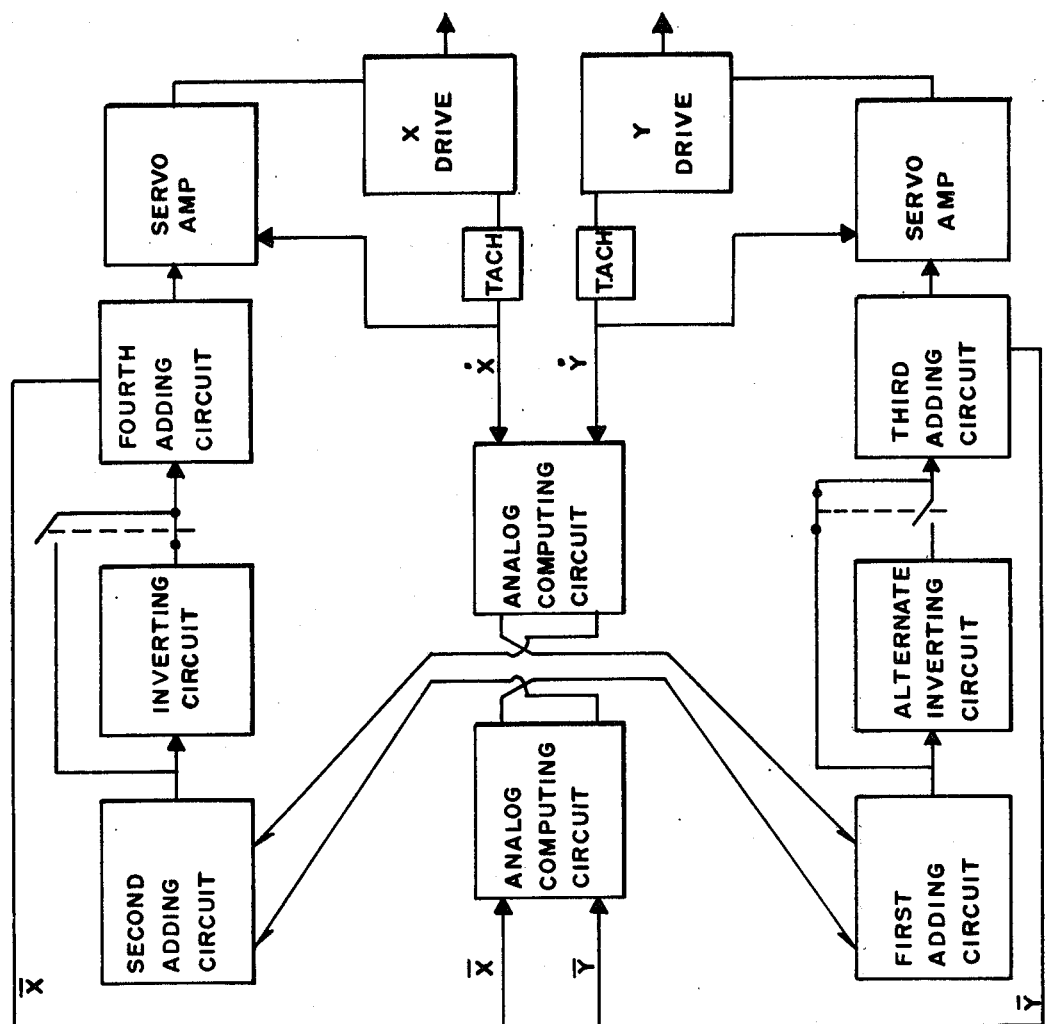
FIG. 2 is a block diagram illustrating the signal flow through a tracer probe control according to this invention.
Figure 1:
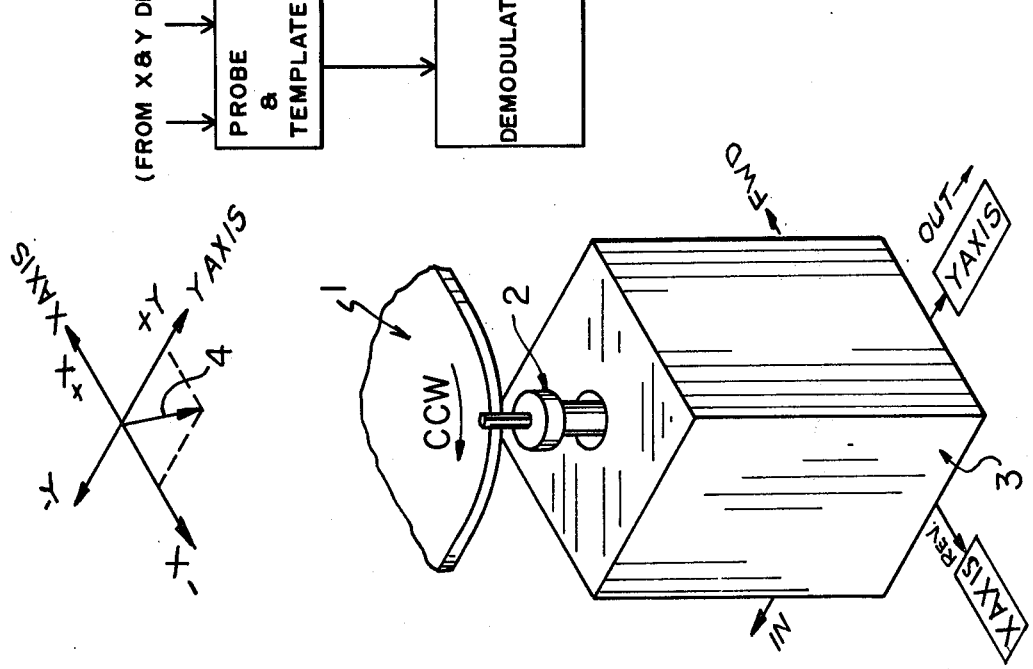
FIG. 1 is a schematic illustration of a probe and template with co-ordinate systems set forth for explaining the details of this invention.

Referring now to FIG. 1, there is shown an outside template 1 with a probe 2 resting against the edge thereof. The probe is supported by a housing 3 mounted, for example, on an X-Y position table. For the purposes of explaining this invention, certain references are arbitrarily chosen. The x axis, that is, the direction along which the x drive of the position table moves the probe and probe housing is shown in FIG. 1 with the designated "forward" and "reverse" directions indicated. The y axis and the designated "in" and "out" directions are also indicated. Shown at the top of FIG.

1 is a co-ordinate system for defining the two deflection signals produced by a deflection of the probe away from the template normal to the edge of the template. A deflection, for example, in the "out" direction along the y axis produces a positive $\bar{y}$ deflection signal. A deflection for the probe position shown in FIG. 1 by the vector 4 in a direction between the x reverse and the y out directions produces a positive y deflection signal and a negative $\bar{x}$ deflection signal.

Assuming the probe follows the outside template in the direction shown by the arrow marked "CCW" the direction of travel about the template is counter-clockwise (looking toward the template from the base of the probe). For an inside template the travel would be clockwise. The following table establishes the logical meaning of clockwise trace and counter-clockwise trace for this specification in terms of the direction of the probe deflection and the direction of the probe movements.

TABLE 1

| Probe Deflection | Clockwise Trace | | Counter-Clockwise Trace | |
|---|---|---|---|---|
| | Movement X axis | Movement Y axis | Movement X axis | Movement Y axis |
| +Y | Reverse | — | Forward | — |
| −Y | Forward | — | Reverse | — |
| −X | — | In | — | Out |
| +X | — | Out | — | In |

For purposes of simplicity, the x and y axis are chosen as perpendicular. The herein described invention could be practiced with non-perpendicular drive axes but to no real advantage and with some added complexity.

The deflection signals are directly related to the x and y components of the deflection vector. For the situation illustrated in FIG. 1 the $\bar{y}$ deflection signal, for example, is related to the component of deflection vector 4 lying along the y axis. The deflection signals are produced in the usual manner by two perpendicularly orientated differential transformers mounted along the probe. The transformers are excited by alternating signals produced by a sine wave oscillator. A particularly suitable probe and probe housing are described in an application filed of even date herewith entitled Tracer Head and assigned to the assignee of this application.

The deflection of the stylus 2 away from an axis along which it would align if no deflection existed causes a change in the coupling of the differential transformers resulting in a change in the amplitude and phase of the transformer outputs. This output is demodulated in the known manner to produce d.c. deflection signals.

Figure 3:
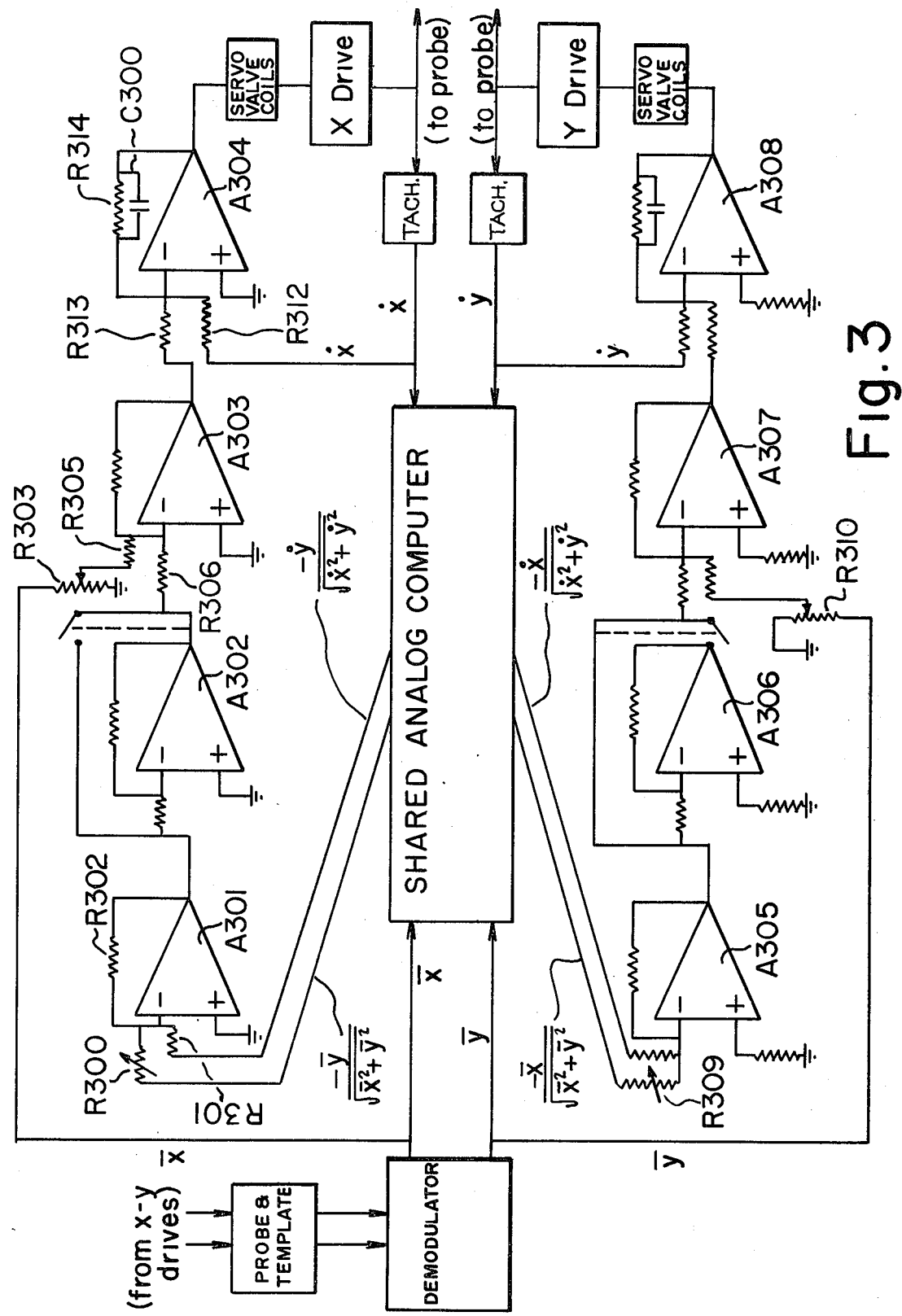
FIG. 3 is a mixed block diagram and circuit diagram illustrating one embodiment of this invention.

Referring now to FIG. 3 there is shown a partial block and circuit diagram illustrating one implemention of this invention. Four operation amplifiers (op. amps.) perform the first and second adding functions A301 and A303, the inverting functions A302, and the servo amplifier function A 304 on one side of the circuit. The other side of the circuit also comprises four op. amps. A305, A306, A307, and A308 in an identical relationship. The op. amps. all are connected in the inverting mode such that the input voltages are added and inverted (the sign is changed).

The analog computer circuit is time shared and calculates the vector sum of two inputs and then calculates normalized outputs which comprise the two inputs each divided by the vector sum (the square root of the sum of the squares). The analog circuit used in the embodiment shown in FIG. 3 also performs a signal inversion.

To understand the circuitry of FIG. 3, the relationships between the servo amplifier input and output, the drive direction and the sign of the resulting tachometer signals need to be postulated. These are set forth in the following table:

TABLE II

| X drive Servo output | X drive Direction | X velocity Tach signal |
|---|---|---|
| + | FWD | + (45v/1000 rpm) |
| − | REV | − (45v/1000 rpm) |
| Y drive Servo output | X drive Direction | Y velocity Tach signal |
| + | OUT | + (45v/1000 rpm) |
| − | IN | − (45v/1000 rpm) |

Figure 4:
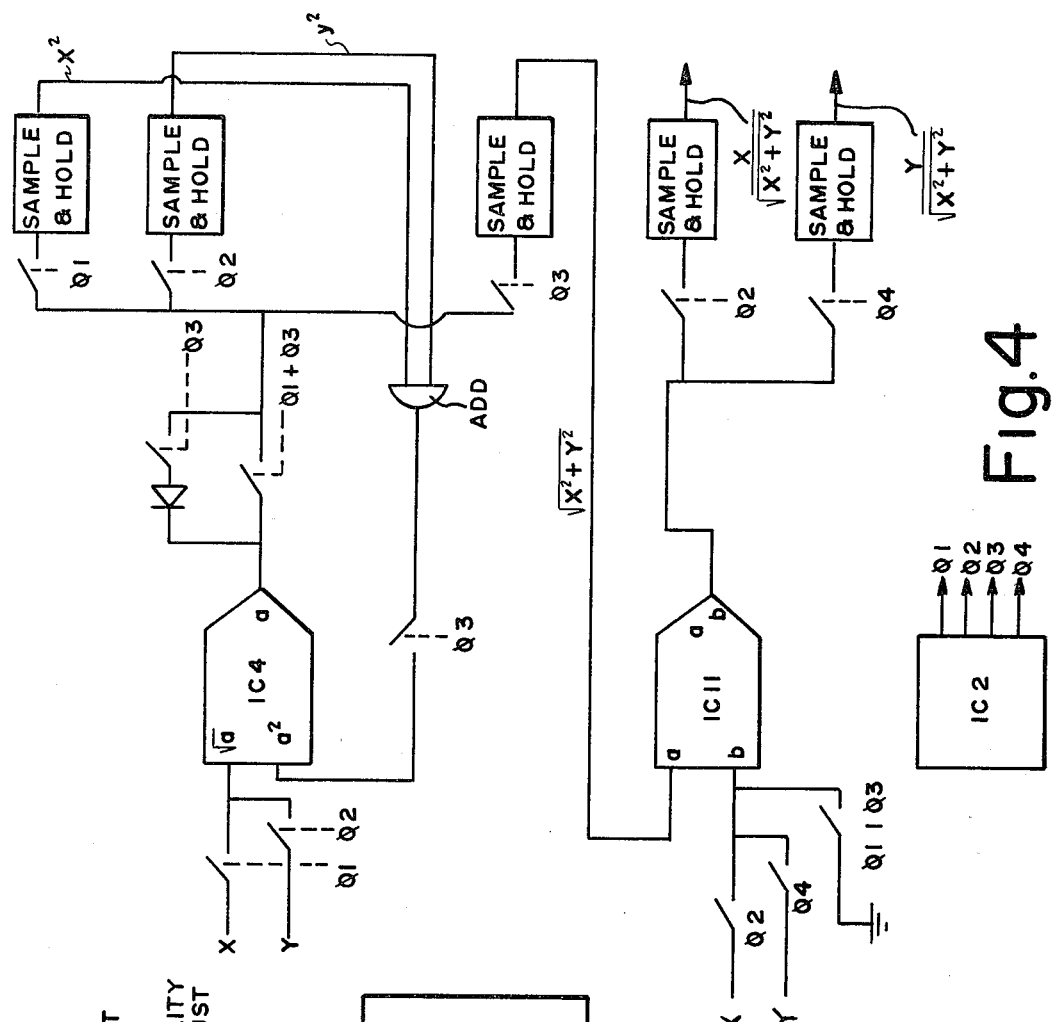
FIG. 4 is a block diagram illustrating the general nature of an analog computer circuit suitable for calculating the normalized drive signals and normalized deflection reference signals.

FIG. 4 is a schematic diagram of an analog computer for calculating the vector sum of the two inputs and normalized outputs comprising each input divided by the vector sum. The computer makes use of available integrated circuits (IC's) for example, a circuit for creating sequential gating pulses (01, 02, 03, and 04), an IC which will either square or find the square root of an input (IC4), and an IC which divides one input by another (IC11). The computer also uses a number of sample and hold circuits which receive an input signal and holds that signal as its output until needed in a subsequent step in the computation. A number of gates or switches are shown, each operated by one or more of the gating pulses. On FIG. 4 each switch has indicated nearby the pulse or pulses that cause the gate to be temporarily closed to thus pass the signal.

On the first pulse (01) the $\bar{x}$ deflection signal is past to IC4 at the terminal marked $\sqrt{a}$ in which it is squared and the output of IC4 is passed to a sample and hold circuit. On the second pulse (02) the $\bar{y}$ deflection signal is squared and applied to a sample and hold circuit. The output of the above sample and hold circuits are summed and on the next pulse (03) and applied to the input terminal marked $a^2$ of IC4. The output of IC4 now being the square root of the sum of the squares is passed to a fourth sample and hold circuit. On the next sequence of pulses, on the second pulse (02) the quotient of $\bar{x}$ and the vector sum is calculated and passed to a sample and hold circuit. On the fourth pulse (04) the quotient of $\bar{y}$ and the vector sum is calculated and passed to a sixth sample and hold circuit. Two of the above described analog computers may be used, one for computing the normalized $\bar{x}$ and $\bar{y}$ deflection vectors and the other for calculating the normalized $\dot{x}$ and $\dot{y}$ velocity vectors (deflection reference vectors). On the other hand, the analog computer described can be time shared and used to provide all four calculations.

Operation: Deflections Correct

The signal flow for the counter-clockwise trace illustrated in FIG. 1 will be as follows. Assume the deflection vector 4 forms a 30 degree angle with the y axis and that the deflection is about 0.020 inches along the vector. As will become apparent, the sought for deflection is exactly 0.020 inches. Now, therefore, the y deflection is 0.0173 inches and the x deflection is 0.01 inches. The $\bar{x}$ and $\bar{y}$ deflection signals are therefore minus 1.5 and plus 2.59 volts respectively. This assumes that the scale of the deflection-deflection signal conversion is 0.15 volts per 0.001 inches.

The analog computer will calculate the vector sum of the deflection signals by finding the square root of the sum of the squares. In this case the vector sum is 3 volts. Then the normalized deflection signals are found by dividing the deflection signals each by the vector sum. The quotient is multiplied by a sealing factor of 2.5. Recalling that the analog computer produces a signal inversion, the normalized $\bar{x}$ and $\bar{y}$ deflection signals for the position shown in FIG. 1 are plus 1.25 volts and minus 2.165 volts respectively (note the absolute values are proportional to the cosine and sine of the angle between the vector 4 and the $y$ axis).

Now assuming that the tangent trace speed is set at 25 inches per minute (how will be explained later), then the X and Y drives would be moving at the rates of reverse 21.65 inches per minute and in 12.5 inches per minute respectively. Where the tachometers are scaled to provide 0.9 volts per inch per minute the $\dot{x}$ and $\dot{y}$ tachometer output signals will be minus 19.48 volts and minus 11.25 volts respectively.

The analog computer will compute the vector sum of the velocity signals which is simply the square root of the sum of the squares. From this the normalized $\dot{x}$ and $\dot{y}$ deflection reference signals are calculated by dividing each by the vector sum and multiplying by 2.5. In the case illustrated in FIG. 1, $\dot{x}$ and $\dot{y}$ deflection reference signals are plus 2.165 and plus 1.25 respectively (recall the analog computer inverts the signals).

The normalized $\bar{y}$ drive and $\dot{y}$ reference signals are summed and inverted in op. amp. A301. As with any op. amp., in the summing mode the inputs are scaled by the ratio of the input resistors to the feedback resistor. In the control system illustrated in FIG. 3, it is assumed that the input resistor R301 has a value 2 times the value of the resistor R302 and at half speed the resistors R300 and R302 have identical values. Hence, the output of op. amp. A301 would be, in the example given, 1.540 volts. This is the sum of minus 2.165 volts and 0.625 volts (1.25 volts divided 2) with the sign inverted.

For counterclockwise trace, the output of A301 is inverted by op. amp. A302 with no gain. The output of inverter A302 and an $\bar{x}$ deflection signal (scaled by 0.4166) are summed and inverted in op. amp. A303. The output of A303 is then 2.165. The $\bar{x}$ deflection signal was scaled by 0.4166 so that its absolute value would equal the normalized $\dot{x}$ deflection reference signal times the gain in op. amp. A301.

Ignoring the negative feedback directly around the servo amp. and around the tachometer loop, the output of the servo amp. A304 is simply inverted, i.e., minus 2.165 volts (unity gain is assumed for the servo amp.). The negative output of the servo amp. is, of course, correct as a negative signal from the servo amp. results in a reverse drive of the $x$ motor, which is the direction need for the counterclockwise trace illustrated in FIG. 1. The value is clearly correct as it is proportional to the cosine of 30°, i.e., 0.866 (multiply 2.165 by 0.4).

A similar explanation applies to the other side of the circuit including op. amps. A305, A307 and A308. Note that op. amp. A306 is bypassed for counterclockwise movement. For the example given, the output of A305 is minus 2.332 volts; the output of A307 is 1.25 volts; and the output of A308 is minus −1.25 volts. The output of servo amp. A308 is negative which drives the Y motor in the in direction and the value is corrected as it is proportional to the sine of 30°, that is 0.5 (0.4 × 1.25).

The gain of the normalized deflection reference signals $\bar{x}$ and $\bar{y}$ applied to op. amps. A301 and A305 may be changed by adjusting the variable resistors R300 and R309 which are ganged to be adjusted together. The change in the gain of this signal controls the trace speed which may be as high as 50 inches/minute in practical embodiments of this invention.

The scale factor resistors R303 and R310 maybe ganged together. Changing the scale factor of the deflection feedback signals enables the desired deflection to be adjusted. Applicants have found a probe deflection of about 0.020 inches is quite satisfactory.

The direct tachometer feedback to the servo amp. is scaled down by the choice of input resistors R312. In practice, an input resistor 4 times the size of the feedback resistor R314 is suitable. This negative feedback reduces the gain of the servo amplifier and X drive, but increased the linearity of the response to the drive signal. Velocity feedback also keeps the drive velocity locked to the control signal (servo amp. input) regardless of changes in drive characteristics, i.e., friction and loading.

Figure 5:
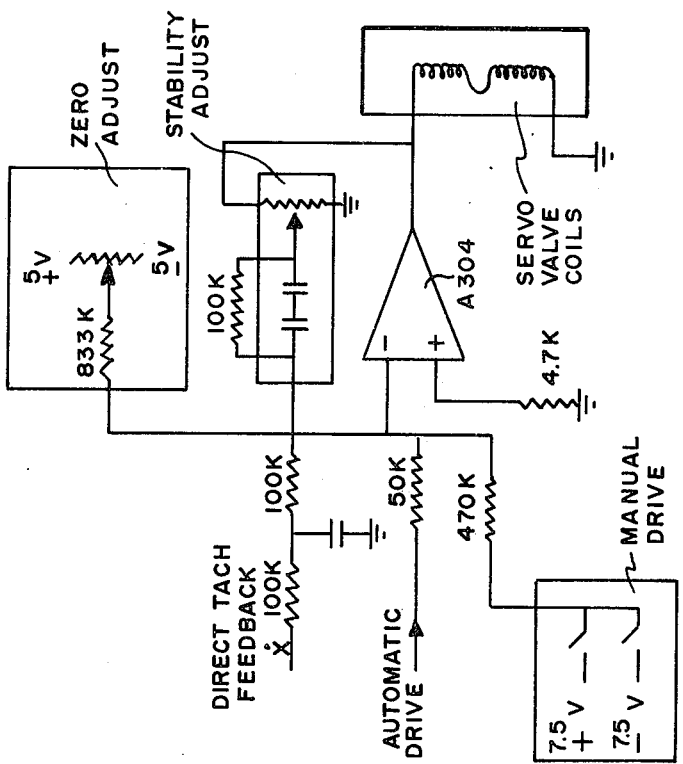
FIG. 5 is a circuit diagram illustrating a servo amp hook-up suitable for practice of this invention.

The details of the hook-up for the servo amp. A304 are illustrated in FIG. 5. The zero adjust enables correction of fixed errors in the op. amp. A304 such that at zero input to the servo amp. the servo motor will be still (assuming the servo value is zeroed). The stability adjust varies the gain of the servo amp. and changes the response time of the amplifier thereby allowing the rate of correction to an input signal change to be matched to the particular drive mechanism.

To bring the probe into initial contact with the template, it is necessary to have a manual drive. (No automatic drive takes place without deflection). Manual drive signals are applied to the servo amp. as shown in FIG. 5. To prevent the probe from being manually driven into the template to the point where either the probe or the template is damaged, it is desirable that the control circuit be provided with a shutdown which shuts down the X and Y drive motors when the $x$ or $y$ deflection signals total exceed an amount corresponding to a dangerous deflection.

Operation: Deflection Incorrect

Now suppose the probe deflection exceeds the desired 0.20 inches and is, say .030 inches in the direction shown in FIG. 1. The normalized $\bar{x}$ and $\bar{y}$ drive signals and the normalized $\dot{x}$ and $\dot{y}$ deflection reference signals will remain unchanged, in spite of the fact that the $\bar{x}$ and $\bar{y}$ deflection signals will now be minus 2.25 and plus 3.90 volts respectively. As a result the output of the servo amp. A304 is 0.312 volts more negative and the output of the servo amp. A308 will be 0.546 volts less negative. Hence, the probe will be given an additional movement in the direction of the deflection thus lessening the deflection and bringing the deflection to the desired 0.02 inches.

SUMMARY

Applicants tracer control has been found to provide accurate template reproduction. The trace speed is always uniform as only the direction of trace is control by the direction of probe deflection. The theory of operation of applicants invention can be understood by using the mathematical concepts of vectors. The $\bar{x}$ and $\bar{y}$ deflection signals can be considered the vector components of the deflection vector, defining the direction and magnitude of probe deflection. By dividing the $\bar{x}$ and $\bar{y}$ deflection vectors by their vector sum, the components of a unit vector (magnitude of 1) are provided which have the same values for a given direction of deflection no matter what the magnitude of the deflection. These normalized signals are the $x$ and $y$ components of a normalized (unit) deflection vector. This vector when rotated 90° either clockwise or counter-clockwise defines the direction that the probe must travel to trace the template edge. Rotation in this instance is achieved by exchanging the $\bar{x}$ and $\bar{y}$ components of the normalized deflection vector and for clockwise trace, the sign of the $\bar{y}$ component is inverted before exchanging the $\bar{x}$ and $\bar{y}$ components.

Prior art control systems have rotated the deflection vector 180° and used it as the deflection reference vector. See U.S. Pat. No. 2,983,858. Applicants, however, derive the deflection reference vector not from the deflection vector itself but from a velocity vector. The velocity vector is defined by its $x$ and $y$ components measured by the tachometers on the X and Y drive motors. The normalized outputs of the velocity vector must be rotated 90 degrees such that it is pointed directly opposite to the deflection vector. The rotated normalized velocity vector when properly scaled will provide a reference against which the actual deflection vector is compared. If the deflection vector is not equal in magnitude to the deflection reference vector, the vector sum of the two will define a correction drive vector for returning the probe to the desired deflection.

Having thus described our invention with the detail and particularity as required by the Patent Laws, what is desired protected by Letters Patent is set forth in the following claims.

We claim:

1. In a system for controlling the relative movement between a tracer probe and a template comprising:
   a tracer probe that bears upon the template and is deflected substantially normal to the surface of the template at the point of contact,
   means for producing deflection signals indicative of the deflection of the probe in selected first and second directions,
   drive means for driving the probe in the first and second directions simultaneously,
   means for sensing the speed of the probe moving in the said first and second directions and for producing velocity signals,
   the improvement comprising:
   an analog computing circuit for computing the vector sum of deflection signals and for computing normalized drive signals being the deflection signals divided by the said vector sum,
   an analog computing circuit for computing the vector sum of the velocity signals and for computing normalized deflection reference signals being the velocity signals divided by the said vector sum,
   first summing means adding a scaled normalized drive signal and a scaled normalized deflection reference signal both corresponding to the first direction,
   second summing means adding the other scaled normalized drive signal and the other scaled normalized deflection reference signal both corresponding to the second direction;
   means for inverting the sign of the output of the first summing means;
   third summing means for adding a scaled deflection signal corresponding to the second direction to the inverted output of the first summing means,
   fourth summing means for adding a scaled deflection signal corresponding to the first direction to the output of the second summing means,
   means for controlling the drive means for the first direction with the output of the fourth summing means, and
   means for controlling the drive means for the second direction with the output of the third summing means.

2. The improvement according to claim 1 in which the means for sensing the speed of the probe in the first and second directions are tachometers attached to the drive means.

3. The improvement according to claim 1 in which one analog computing circuit computes both the normalized drive signals and the normalized velocity signals by time sharing one computer and applying the outputs to temporary holding circuits.

4. The improvement according to claim 1 in which the surface of the probe is designed to substantially eliminate a drag on said probe opposite the direction of travel.

5. The improvement according to claim 1 in which the drive means comprise hydraulic motors controlled by proportional electro-hydraulic servo valves.

6. The improvement according to claim 1 in which probe velocity signals are fed back directly around the drive means and the means for controlling the drive means for improving the linearity of the response to the input to the control means.

7. The improvement according to claim 1 in which an integrated output of said means for controlling is fed back to make the means for controlling the drive means less sensitive to transient signals.

8. The improvement according to claim 1 further comprising means for introducting a manual drive signals.

9. The improvement according to claim 8 further comprising shutdown means for shutting down the drive means when the sum of the deflection signals exceeds a selected reference signal.

10. The improvement according to claim 1 in which the direction of the trace (counter-clockwise or clockwise) may be changed by changing which output of the third and fourth summary means is inverted.

* * * * *

UNITED STATES PATENT AND TRADEMARK OFFICE
CERTIFICATE OF CORRECTION

PATENT NO. : 4,117,385
DATED : September 26, 1978
INVENTOR(S) : Walter S. Limbach, II, et al.

It is certified that error appears in the above-identified patent and that said Letters Patent are hereby corrected as shown below:

In the Abstract - Line 4 "y' " should read --$\dot{y}$--.

Column 4 Line 19 "(01,02,03, and 04)" should read --($\dot{\theta}$1,$\dot{\theta}$2,$\dot{\theta}$3, and $\dot{\theta}$4)--.

Column 4 Line 30 "(01)" should read --($\dot{\theta}$1)--.

Column 4 Line 33 "(02)" should read --($\dot{\theta}$2)--.

Column 4 Line 36 "(03)" should read --($\dot{\theta}$3)--.

Column 4 Line 40 "(02)" should read --($\dot{\theta}$2)--.

Column 4 Line 43 "(04)" should read --($\dot{\theta}$4)--.

Signed and Sealed this

Nineteenth Day of December 1978

[SEAL]

Attest:

RUTH C. MASON
Attesting Officer

DONALD W. BANNER
Commissioner of Patents and Trademarks